United States Patent
Patel et al.

(10) Patent No.: US 9,600,892 B2
(45) Date of Patent: Mar. 21, 2017

(54) NON-PARAMETRIC METHOD OF AND SYSTEM FOR ESTIMATING DIMENSIONS OF OBJECTS OF ARBITRARY SHAPE

(71) Applicant: SYMBOL TECHNOLOGIES, INC., Lincolnshire, IL (US)

(72) Inventors: Ankur R Patel, Palatine, IL (US); Kevin J O'Connell, Palatine, IL (US); Cuneyt M Taskiran, Chicago, IL (US); Jay J Williams, Glenview, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/534,224

(22) Filed: Nov. 6, 2014

(65) Prior Publication Data

US 2016/0133026 A1    May 12, 2016

(51) Int. Cl.
*G06T 7/00* (2006.01)
*G06K 9/00* (2006.01)
(Continued)

(52) U.S. Cl.
CPC ........ *G06T 7/0081* (2013.01); *G06K 9/00201* (2013.01); *G06T 7/0042* (2013.01); *G06T 7/0057* (2013.01); *G06T 7/0085* (2013.01); *G06T 7/0087* (2013.01); *G06T 7/602* (2013.01); *G06T 7/604* (2013.01); *G06T 17/10* (2013.01); *G06T 17/30* (2013.01); *G06T 19/00* (2013.01);
(Continued)

(58) Field of Classification Search
CPC ....... G06T 7/602; G06T 7/004; G06T 7/0051; G06T 2207/10028; G06K 7/10722; G06K 7/1443; G06K 9/00201
See application file for complete search history.

(56) References Cited

U.S. PATENT DOCUMENTS

| 5,988,862 A * | 11/1999 | Kacyra ............... G01B 11/002 382/195 |
| 7,373,722 B2 | 5/2008 | Cooper et al. |
| 7,527,205 B2 | 5/2009 | Zhu et al. |

(Continued)

FOREIGN PATENT DOCUMENTS

| EP | 2562688 | 2/2013 |
| WO | 03002935 | 1/2003 |

OTHER PUBLICATIONS

Schnabel et al. "Efficient RANSAC for Point-Cloud Shape Detection", vol. 0, No. 0, pp. 1-12.*

(Continued)

*Primary Examiner* — Chan Park
*Assistant Examiner* — Mia M Thomas

(57) ABSTRACT

A non-parametric method of, and system for, dimensioning an object of arbitrary shape, captures a three-dimensional (3D) point cloud of data points over a field of view containing the object and a base surface on which the object is positioned, detects a base plane indicative of the base surface from the point cloud, extracts the data points of the object from the point cloud, processes the extracted data points of the object to obtain a convex hull, and fits a bounding box of minimum volume to enclose the convex hull. The bounding box has a pair of mutually orthogonal planar faces, and the fitting is performed by orienting one of the faces to be generally perpendicular to the base plane, and by simultaneously orienting the other of the faces to be generally parallel to the base plane.

16 Claims, 5 Drawing Sheets

(51) Int. Cl.
  *G06T 7/60*   (2006.01)
  *G06T 17/10*  (2006.01)
  *G06T 17/30*  (2006.01)
  *H04N 13/02*  (2006.01)
  *G06T 19/00*  (2011.01)

(52) U.S. Cl.
  CPC .................. *H04N 13/0203* (2013.01); *G06T 2207/10028* (2013.01); *G06T 2207/20* (2013.01); *G06T 2210/12* (2013.01); *G06T 2210/56* (2013.01); *G06T 2219/012* (2013.01)

(56) References Cited

U.S. PATENT DOCUMENTS

| | | | |
|---|---|---|---|
| 7,605,817 B2* | 10/2009 | Zhang | G06T 7/2086 345/473 |
| 7,647,752 B2 | 1/2010 | Magnell | |
| 8,134,717 B2 | 3/2012 | Pangrazio et al. | |
| 8,199,977 B2* | 6/2012 | Krishnaswamy | G06K 9/00201 345/589 |
| 8,265,895 B2 | 9/2012 | Willins et al. | |
| 8,284,988 B2 | 10/2012 | Sones et al. | |
| 8,542,252 B2 | 9/2013 | Perez et al. | |
| 9,070,285 B1* | 6/2015 | Ramu | G05D 1/0044 |
| 2005/0114059 A1* | 5/2005 | Chang | G06Q 10/04 702/84 |
| 2008/0238919 A1* | 10/2008 | Pack | G06T 15/04 345/420 |
| 2009/0103773 A1* | 4/2009 | Wheeler | G01S 7/4802 382/100 |
| 2010/0118116 A1* | 5/2010 | Tomasz | G01C 11/02 348/36 |
| 2010/0295850 A1* | 11/2010 | Katz | G06T 15/40 345/421 |
| 2010/0315412 A1* | 12/2010 | Sinha | G06T 15/00 345/419 |
| 2011/0052043 A1* | 3/2011 | Hyung | G06T 7/208 382/154 |
| 2011/0137527 A1* | 6/2011 | Simon | B60R 1/00 701/45 |
| 2011/0216063 A1* | 9/2011 | Hayes | G06T 17/20 345/423 |
| 2011/0310088 A1* | 12/2011 | Adabala | G06T 19/003 345/419 |
| 2012/0075342 A1* | 3/2012 | Choubassi | G06T 7/0081 345/633 |
| 2012/0209553 A1* | 8/2012 | Doytchinov | G01B 21/047 702/81 |
| 2012/0236119 A1* | 9/2012 | Rhee | G01S 3/7864 348/46 |
| 2012/0250978 A1* | 10/2012 | Taylor | G06T 7/0081 382/154 |
| 2013/0144565 A1* | 6/2013 | Miller | G06T 17/00 703/1 |
| 2013/0156292 A1* | 6/2013 | Chang | G06T 7/001 382/141 |
| 2013/0162806 A1* | 6/2013 | Ding | G01B 11/0608 348/86 |
| 2013/0236089 A1* | 9/2013 | Litvak | G06K 9/00382 382/154 |
| 2013/0321418 A1* | 12/2013 | Kirk | G06T 15/04 345/423 |
| 2013/0329013 A1 | 12/2013 | Metois et al. | |
| 2014/0002597 A1* | 1/2014 | Taguchi | H04N 13/0275 348/43 |
| 2014/0049616 A1 | 2/2014 | Stettner | |
| 2014/0098094 A1* | 4/2014 | Neumann | G06K 9/00214 345/420 |
| 2014/0100813 A1* | 4/2014 | Showering | G01B 21/02 702/141 |
| 2014/0104413 A1* | 4/2014 | McCloskey | G06Q 10/083 348/135 |
| 2014/0192050 A1* | 7/2014 | Qiu | G06K 9/00214 345/420 |
| 2014/0267614 A1* | 9/2014 | Ding | H04N 13/0275 348/46 |
| 2015/0015602 A1* | 1/2015 | Beaudoin | G06T 7/0004 345/619 |
| 2015/0154467 A1* | 6/2015 | Feng | G06K 9/48 382/203 |
| 2015/0181198 A1* | 6/2015 | Baele | G06T 7/0018 348/46 |
| 2016/0012588 A1* | 1/2016 | Taguchi | G06T 7/0018 348/46 |
| 2016/0163067 A1* | 6/2016 | Williams | G01B 11/00 382/154 |

OTHER PUBLICATIONS

Buenaposada et al. "Real-time tracking and estimation of plane pose" Proceeedings of the ICPR (Aug. 2002) vol. II, IEEE pp. 697-700 (pp. 1-4).*

Yang et al. "Plane Detection in Point Cloud Data" Department of Photogrammetry Institute of Geodesy and Geoinformation University of Bonn, TR-IGG-P-2010-01 Jan. 25, 2010. pp. 1-16.*

"Plane Detection in Point Cloud Data" by Michael Ying Yang, Wolfgang Forstner, dated Jan. 25, 2010, Technical Report No. 1, 2010 University of Bonn.

International Search Report and Written Opinion, mailed Jan. 8, 2016, in counterpart PCT application PCT/US2015/054120.

F.C.A. Groen et al., The Smallest Box Around a Package, Pattern Recognition, vol. 13, No. 1-6 Jan. 1, 1981,pp. 176-178.

* cited by examiner

US 9,600,892 B2

NON-PARAMETRIC METHOD OF AND SYSTEM FOR ESTIMATING DIMENSIONS OF OBJECTS OF ARBITRARY SHAPE

BACKGROUND OF THE INVENTION

The present disclosure relates generally to capturing dimension data indicative of an object's dimensions and, more particularly, to a non-parametric method of and system for estimating the dimensions or volume of an object of arbitrary or undetermined shape, without having any advance knowledge or parametric model of the shape of the object.

Determining the dimensions or volume of an object, such as a shipping package, a mailing parcel, or a pallet loaded with a plurality of objects as freight or cargo, is desirable, especially in the transportation and shipping industries, where the cost for transporting and delivering the objects is at least partially dependent on their dimensions. Three-dimensional (3D) cameras have been employed in both handheld and fixed devices to capture dimension data indicative of the object's dimensions. Such devices operate by making shape assumptions and by employing parametric models, that is, the devices know in advance that the object has a certain shape, e.g., a cuboid, a cylinder, a sphere, a torus, a plane, etc., because such parametric models are stored in an accessible memory. Although generally satisfactory for their intended purpose, especially when dimensioning cuboid cartons or box-shaped objects, the known devices are not effective in dimensioning an object of arbitrary or undetermined shape, e.g., a pallet having multiple objects randomly stacked thereon, because there is no stored model available for reference.

Accordingly, there is a need to estimate the dimensions or volume of an object of arbitrary or undetermined shape, without having any advance knowledge or parametric model of the shape of the object, and without making any shape assumptions, in an accurate, rapid, efficient and non-parametric manner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
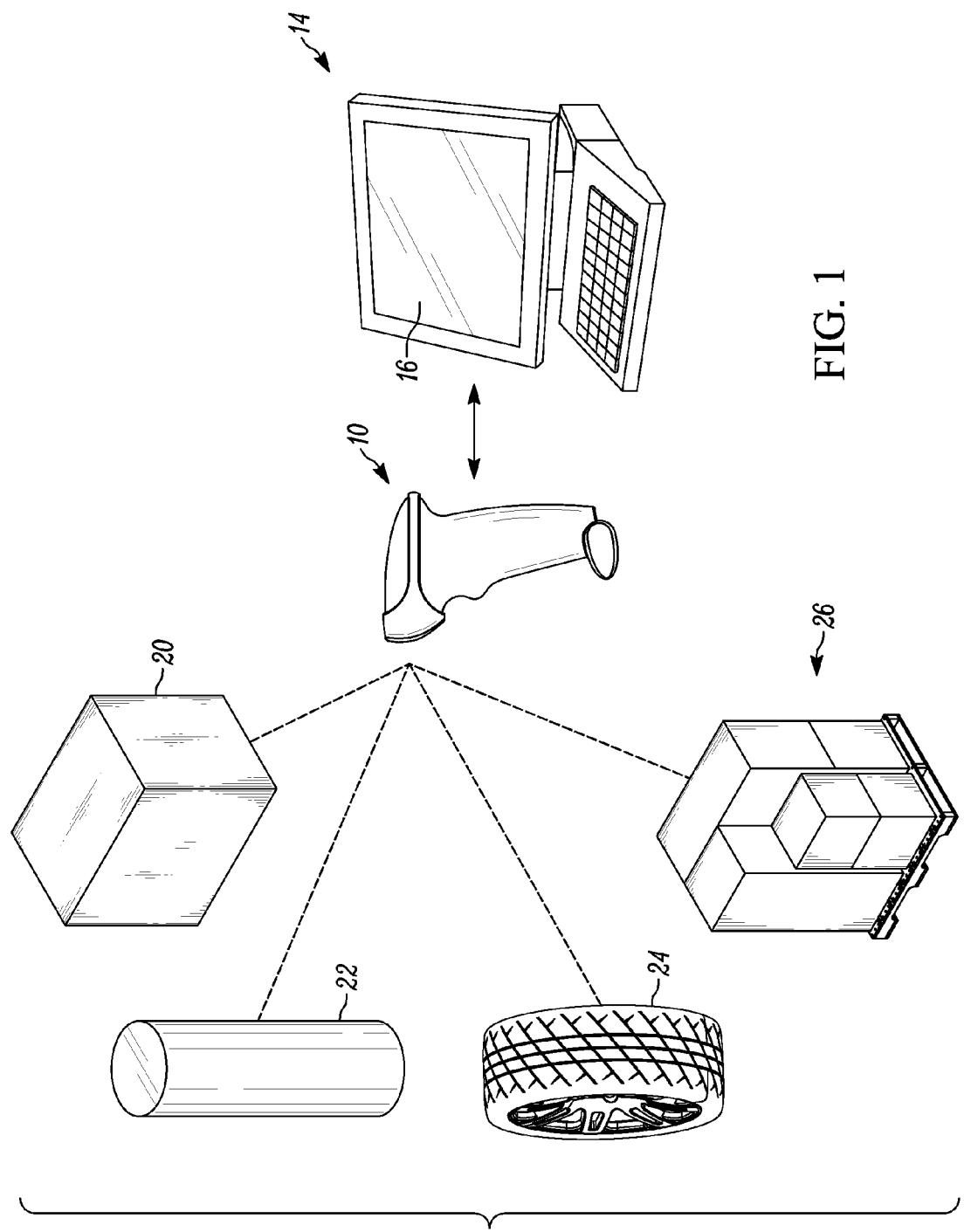
FIG. 1 is a schematic view of a non-parametric system for estimating the dimensions of an object of arbitrary or undetermined shape in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a non-parametric method of dimensioning an object of arbitrary or undetermined shape. The method is performed by capturing a three-dimensional (3D) point cloud of data points over a field of view containing the object and a base surface on which the object is positioned, detecting a base plane indicative of the base surface from the point cloud, extracting the data points of the object from the point cloud, processing the extracted data points of the object to obtain a convex hull, and fitting a bounding box of minimum volume to enclose the convex hull. The bounding box has a pair of mutually orthogonal planar faces, and the fitting is performed by orienting one of the faces to be generally perpendicular to the base plane, and by simultaneously orienting the other of the faces to be generally parallel to the base plane. By so orienting the bounding box, the volume of the bounding box more closely matches the dimensions or volume of the object.

In a preferred embodiment, the detecting of the base plane is performed by determining the plane having the largest area in the field of view, e.g., by executing a random sampling consensus (RANSAC) algorithm. The extracting of the data points of the object is preferably performed by removing the data points of the base plane from the point cloud. If multiple objects are in the field of view, then the data points are clustered, e.g., by Euclidean clustering, to locate the multiple objects in the field of view, and the extracting is preferably performed by either manually or automatically selecting one of the objects, also known as the object or target of interest, to be dimensioned.

In accordance with another aspect of this disclosure, a non-parametric system for dimensioning an object of arbitrary shape, comprises a camera for capturing a three-dimensional (3D) point cloud of data points over a field of view containing the object and a base surface on which the object is positioned, and a controller for detecting a base plane indicative of the base surface from the point cloud, for extracting the data points of the object from the point cloud, for processing the extracted data points of the object to obtain a convex hull, and for fitting a bounding box of minimum volume to enclose the convex hull. The bounding box has a pair of mutually orthogonal planar faces, and the controller is operative for orienting one of the faces to be generally perpendicular to the base plane, and for simultaneously orienting the other of the faces to be generally parallel to the base plane.

Turning now to the drawings, FIG. 1 depicts a device 10 for supporting a three-dimensional (3D) camera or sensor 12 (see FIG. 2) and operatively connected, either by a wired or wireless link, to a computer 14 having a display 16. A controller 18 (see FIG. 2) is located either in the device 10 or the computer 14. The camera 12 and the controller 18 are together operative, as described below, for dimensioning objects of arbitrary or undetermined shapes, such as a cuboid shipping carton 20, a cylindrical mailing tube 22, a toroidal tire 24, and a pallet 26 loaded with a plurality of randomly stacked objects as freight or cargo.

Although the device 10 has been illustrated as a handheld, portable device having a handle that can be gripped by a user, it will be understood that the device could also be a fixed workstation that is stationarily and non-movably mounted relative to the objects to be dimensioned. In an advantageous embodiment, the device is mounted overhead above the objects passing below. Although the computer 14 has been illustrated as a desktop computer, it will be understood that the computer could also be a laptop computer, a smartphone, or a tablet. Although the device 10 and the computer 14 have been illustrated as separate units, they can also be integrated into a single unit. Although the objects have been illustrated as a cuboid carton 20, a cylindrical tube 22, a toroidal tire 24, and a pallet 26 loaded with a plurality of randomly stacked objects, it will be understood that these are merely exemplary shapes, and that many other objects having many other undetermined shapes could have been illustrated.

Figure 2:
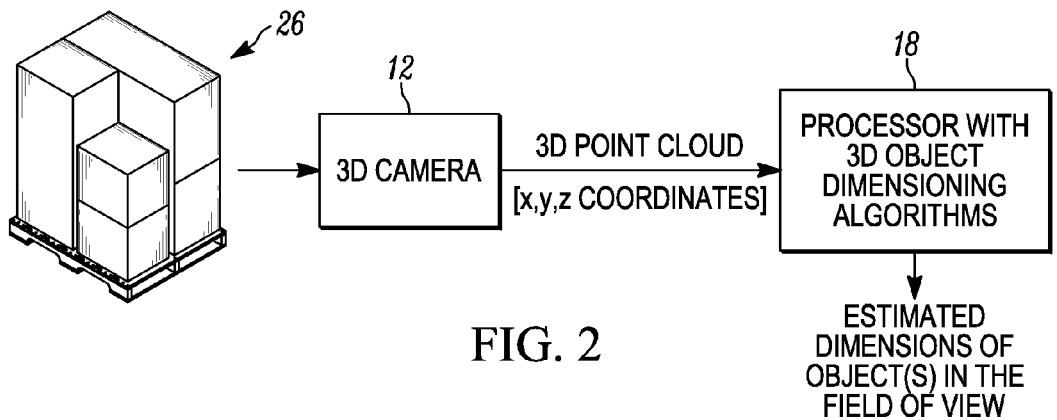
FIG. 2 is a block diagram of the overall system of FIG. 1.

As shown in FIG. 2 for the representative pallet 26, the 3D camera or sensor 12 is operative for capturing a three-dimensional (3D) point cloud of data points over its field of view. Any 3D sensor, including an infrared (IR) sensor, could be used. Each data point has a length coordinate (x), a width coordinate (y), and a depth coordinate (z). The controller 18 may be any general purpose microprocessor, controller, or microcontroller that is suitably configured with memory, and that is capable of executing one or more of the software applications or algorithms, as indicated by the flow chart of FIG. 3, to thereby provide the desired functionality, i.e., to output the estimated dimensions or volume of at least one object in the field of view.

Figure 3:
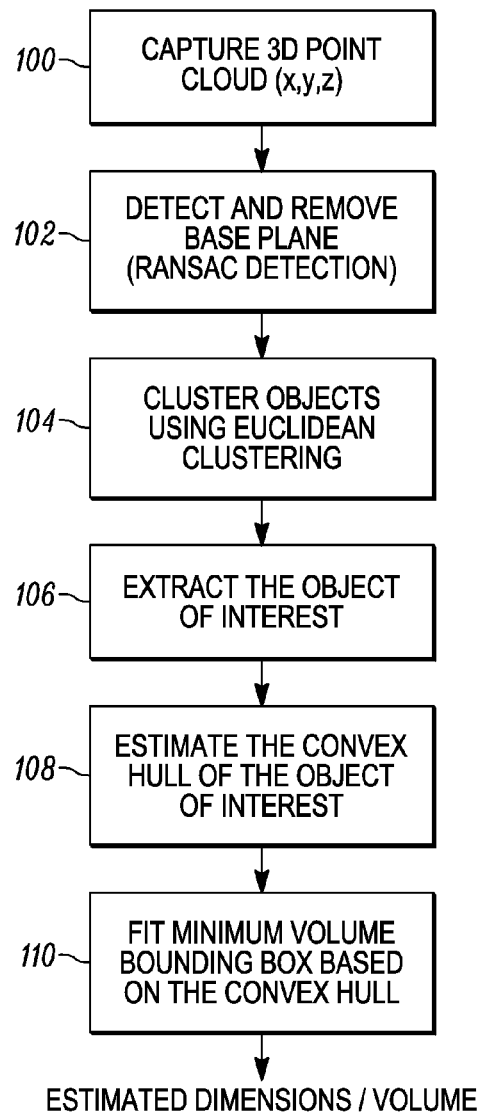
FIG. 3 is a flow chart of a non-parametric method of estimating the dimensions of an object of arbitrary or undetermined shape in accordance with the present disclosure.

Turning now to the flow chart of FIG. 3, the method begins at step 100 by having the camera 12 capture a three-dimensional (3D) point cloud of data points over a field of view of a scene containing at least one object and a base surface on which the object is positioned. For ease of visualization, FIG. 4A depicts an exemplary scene that a user might see. Thus, FIG. 4A depicts a main object or object of interest (in this example, the cylindrical tube 22) casting a shadow 32, one or more secondary objects 28, and a background or base surface 34 (in this case, the floor). FIG. 4B depicts the 3D point cloud of the scene of FIG. 4A.

In step 102, a base plane indicative of the base surface 34 is detected from the data points. In a preferred embodiment, the detecting of the base plane is performed by determining from the data points the plane having the largest area in the field of view, e.g., by executing a random sampling consensus (RANSAC) algorithm. Details of plane detection by using the RANSAC algorithm can be had by reference to "*Plane Detection in Point Cloud Data*", by Yang et al., Technical Report No. 1, Department of Photogrammetry, University of Bonn, Jan. 25, 2010, the entire contents of which is incorporated herein by reference thereto. Once the base plane has been detected, its data points can be removed from the 3D point cloud. This leaves only the data points corresponding to the main object 22 and the secondary objects 28 for further processing.

In step 104, the remaining data points are clustered, e.g., by Euclidean clustering. Clustering is a well established technique in which a multitude of data points are organized into groups that share some similarity, e.g., a distance or closeness to each other. Now that the data points have been clustered, each of the multiple objects 22, 28 in the field of view have now been located. In step 106, the data points of the object of interest, i.e., the main object 22, is extracted, and all the data points of the secondary objects 28 are discarded. Extraction of the main object 22 can be performed manually or automatically. For example, a user may move a cursor over the data cluster displayed on the screen 16, and execute a manual action, e.g., a mouse click, to select the main object 22. Or, the controller 18 can merely select the data cluster that is centrally located in the field of view.

Figure 4C:
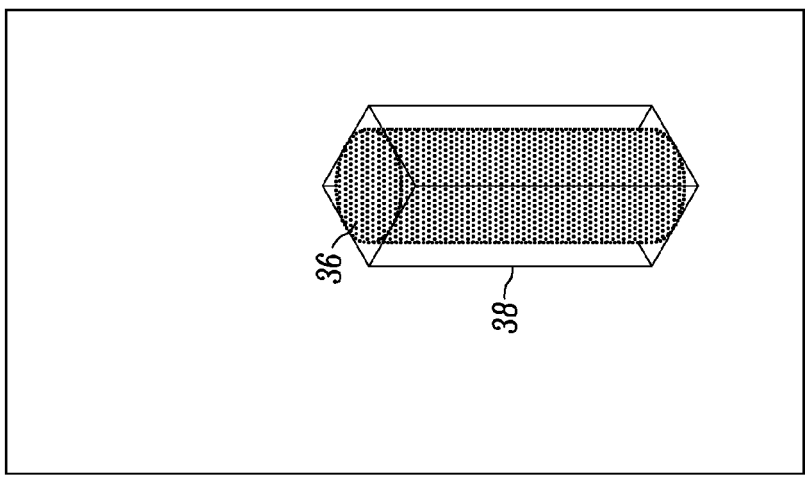
FIG. 4C is a perspective view of a minimum volume bounding box surrounding a convex hull of a data cluster corresponding to the cylindrical main object.
Figure 4B:
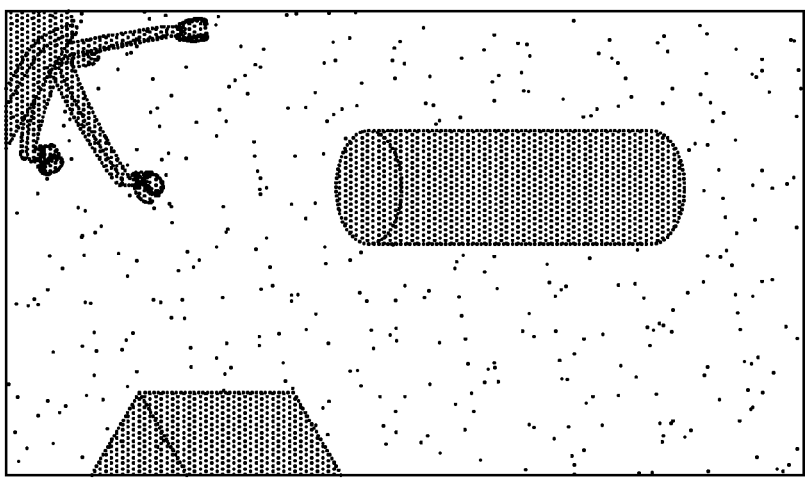
FIG. 4B is a perspective view of a 3D point cloud of the scene of FIG. 4A.
Figure 4A:
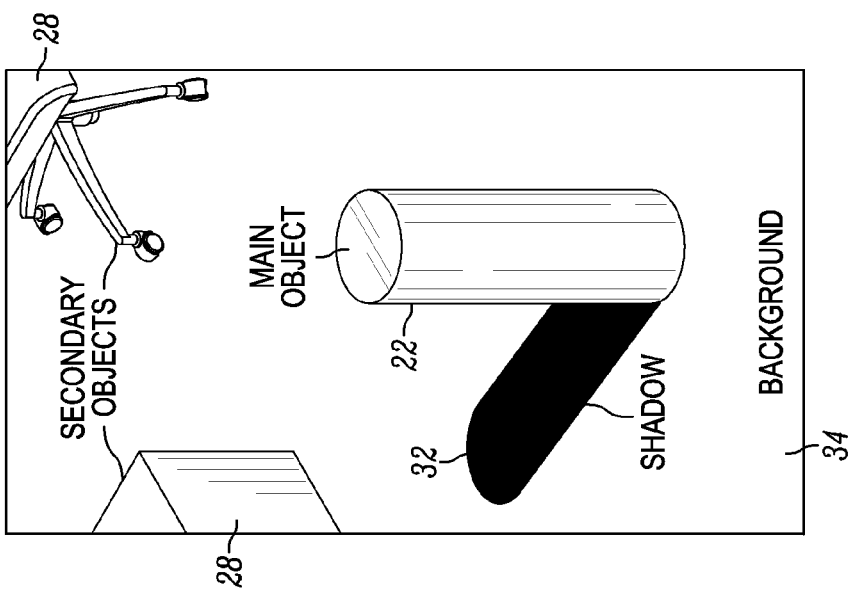
FIG. 4A is a perspective view of a scene containing a cylindrical main object and secondary objects on a background.

The extracted, clustered data points belonging to the main object 22 is depicted in FIG. 4C and processed to obtain, in step 108, a convex hull 36. The convex hull 36 constitutes only those exterior data points located on the outside boundary or envelope of the data points belonging to the main object 22. Obtaining the convex hull is a well established technique of estimating the boundary of multiple data points. See, for example, http://en.wikipedia.org/wiki/Convex hull. In this case, the convex hull 36 of the main object 22 is determined, and the remaining interior data points of the data points belonging to the main object 22 inside the convex hull 36 are discarded.

Figure 6:
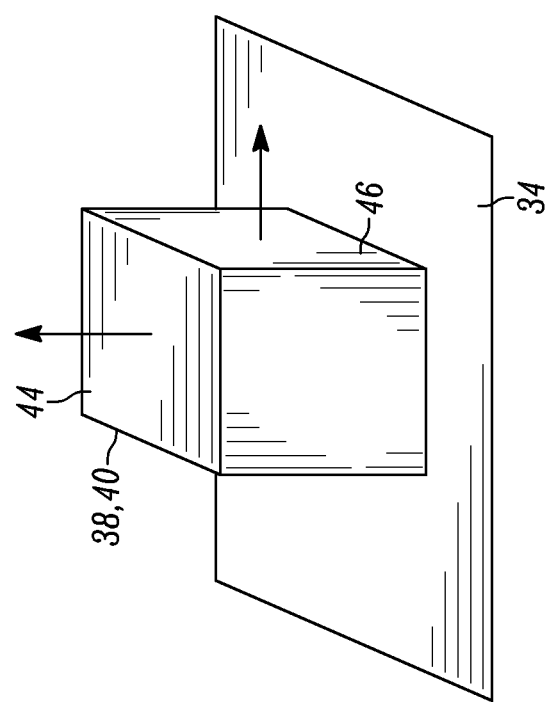
FIG. 6 is a diagrammatic view showing how the bounding box is to be oriented relative to the background or base surface.

In step 110, a bounding box 38 (see FIG. 4C) is fitted to enclose the convex hull 36 with a minimum volume. Fitting a bounding box 38 of minimum volume around data points is a well established technique. See, for example, http://en.wikipedia.org/wiki/Minimum bounding box. In this case, the bounding box 38 has a rectangular parallelepiped or cuboid shape having three pairs of mutually orthogonal planar faces, and is fitted around the convex hull 36. As can be seen in FIG. 4C, the volume of the bounding box 38 closely matches the dimensions or volume of the extracted, clustered data points of the main object 22, thereby accurately dimensioning the main object 22. As shown in FIG. 6, the bounding box 38, as proposed by the present disclosure, is oriented with certain facial constraints. Specifically, at least one of the faces of the bounding box 38, e.g., the top face 44, is oriented to be generally parallel to the base plane 34, and simultaneously one of the other faces of the bounding box 38, e.g., the side face 46, that is orthogonal to the top face 44, is oriented to be generally perpendicular to the base plane 34. The arrows illustrated in FIG. 6 identify the normals to the faces 44, 46.

Figure 5C:
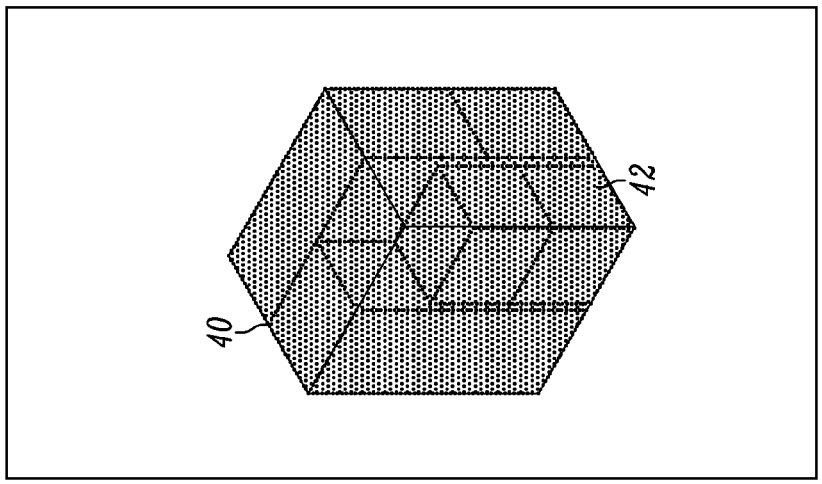
FIG. 5C is analogous to FIG. 4C, but of a stack of cartons.
Figure 5B:
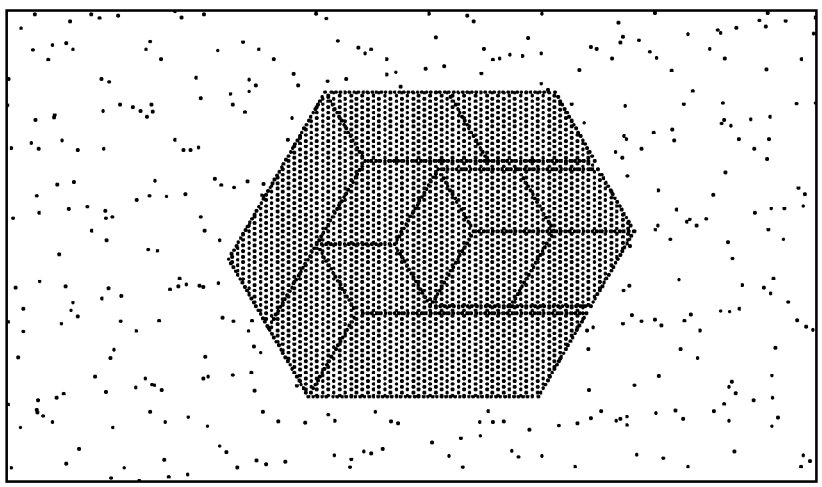
FIG. 5B is analogous to FIG. 4B, but of a stack of cartons.
Figure 5A:
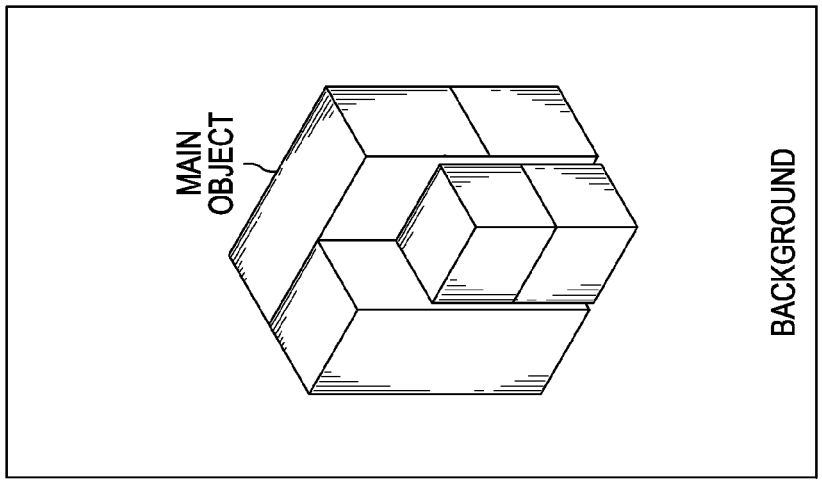
FIG. 5A is analogous to FIG. 4A, but of a stack of cartons.

FIGS. 5A, 5B and 5C are analogous to FIGS. 4A, 4B and 4C, but show a different type of arbitrarily shaped object, i.e., a random stack of cartons. As before, a bounding box 40 (see FIG. 5C) is fitted to enclose a convex hull 42 with a minimum volume, thereby accurately dimensioning the stack of cartons. As shown in FIG. 5C, the bounding box 40 is oriented such that one of its faces is generally perpendicular to the base plane, and simultaneously an orthogonal face is generally parallel to the base plane.

Figure 7:
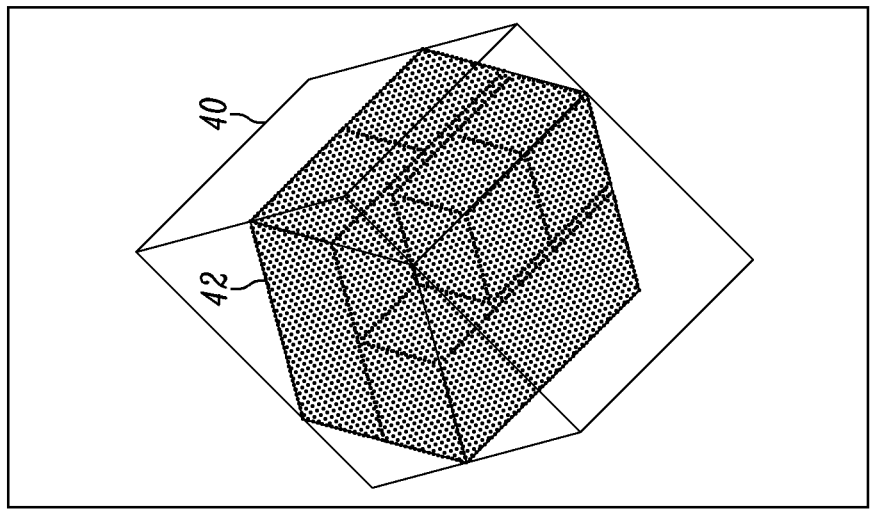
FIG. 7 is a analogous to FIG. 5C, but showing an inclined bounding box that is not oriented in the manner dictated by FIG. 6.

FIG. 7 is to be contrasted with FIG. 5C. Both show bounding boxes fitted to enclose a convex hull 42 with a minimum volume. However, the bounding box of FIG. 7 does not have the facial constraints described above in connection with FIG. 6 and is inclined relative to the base plane. As a result, the bounding box of FIG. 7 does not provide as accurate an estimation of the dimensions or volume of the carton stack as compared to the bounding box 40 of FIG. 5C.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A non-parametric method of dimensioning an object of arbitrary shape, the method comprising:
    capturing, via an image sensor, a three-dimensional (3D) point cloud of data points over a field of view containing the object and a base surface on which the object is positioned;
    detecting, using a logic circuit, a base plane indicative of the base surface from the point cloud;
    extracting, using the logic circuit, first ones of the data points corresponding to the object from the point cloud;
    obtaining, using the logic circuit, a convex hull for the extracted first ones of the data points;
    generating, using the logic circuit and based on data defining the convex hull, a bounding box of minimum volume to enclose the convex hull, the bounding box having first and second mutually orthogonal planar faces;
    constraining the first planar face to be generally perpendicular to the base plane; and
    constraining the second planar face to be generally parallel to the base plane.

2. The method of claim 1, wherein each of the data points includes a length coordinate, a width coordinate, and a depth coordinate.

3. The method of claim 1, wherein the detecting of the base plane is performed by determining a plane having a largest area in the field of view.

4. The method of claim 1, wherein the detecting of the base plane is performed by executing a random sampling consensus (RANSAC) algorithm.

5. The method of claim 1, wherein the extracting of the first ones of the data points corresponding to the object is performed by removing second ones of the data points corresponding to the base plane.

6. The method of claim 1, further comprising clustering data points indicative of multiple objects in the field of view, and wherein the extracting is performed by selecting one of the multiple objects as the object to be dimensioned.

7. The method of claim 6, wherein the clustering of the data points is performed by Euclidean clustering.

8. The method of claim 1, wherein the bounding box is a cuboid having three pairs of mutually orthogonal planar faces.

9. A non-parametric system for dimensioning an object of arbitrary shape, the non-parametric system comprising:
    an imaging device to generate a three-dimensional point cloud of data points over a field of view containing the object and a base surface on which the object is positioned; and
    a controller to:
        detect a base plane indicative of the base surface from the point cloud;
        extract first ones of the data points corresponding to the object from the point cloud;
        obtain a convex hull for the extracted first ones of the data points;
        generate, based on data defining the convex hull, a bounding box of minimum volume to enclose the convex hull, the bounding box having first and second mutually orthogonal planar faces;
        constrain the first planar face to be generally perpendicular to the base plane; and
        constrain the second planar face to be generally parallel to the base plane.

10. The system of claim 9, wherein each of the data points includes data indicative of a length coordinate, a width coordinate, and a depth coordinate.

11. The system of claim 9, wherein the controller is operative to determine the base plane by identifying a plane having a largest area in the field of view.

12. The system of claim 9, wherein the controller is operative to determine the base plane by executing a random sampling consensus (RANSAC) algorithm.

13. The system of claim 9, wherein the controller is operative to extract the first ones of the data points corresponding to the object by removing second ones of the data points corresponding to the base plane.

14. The system of claim 9, wherein the controller is operative to:
    cluster data points indicative of multiple objects in the field of view; and
    respond to an input in which at least one of the objects to be dimensioned is selected.

15. The system of claim 14, wherein the controller is operative to cluster the data points by Euclidean clustering.

16. The system of claim 9, wherein the bounding box is a cuboid having three pairs of mutually orthogonal planar faces.

* * * * *